United States Patent [19]

Fritz

[11] 4,323,373

[45] Apr. 6, 1982

[54] APPARATUS AND METHOD FOR CLEANING AIR

[75] Inventor: Frederick F. Fritz, Oxford, Mich.

[73] Assignee: Oxford Air Systems, Inc., Oxford, Mich.

[21] Appl. No.: 246,329

[22] Filed: Mar. 23, 1981

[51] Int. Cl.³ .............................................. B01D 46/04
[52] U.S. Cl. ............................................ 55/96; 55/233; 55/242; 55/228; 55/227; 126/299 D; 126/299 E; 261/97; 261/106; 55/DIG. 36; 55/85; 55/89; 55/90
[58] Field of Search ................. 55/90, 85, 89, 96, 228, 55/227, 233, 242, 259, 260, DIG. 36; 126/299 D, 299 E, 299 F; 261/106, 97

[56] References Cited

U.S. PATENT DOCUMENTS

| | | | |
|---|---|---|---|
| 2,199,632 | 5/1940 | Keyes | 55/233 |
| 3,242,652 | 3/1966 | Malenchini | 55/228 |
| 3,823,531 | 7/1974 | Crawley | 55/233 |
| 4,084,947 | 4/1978 | Ear | 55/242 |

FOREIGN PATENT DOCUMENTS 2726083  1/1978  Fed. Rep. of Germany ........ 55/233

*Primary Examiner*—Bernard Nozick
*Attorney, Agent, or Firm*—Robert G. Mentag

[57] ABSTRACT

An apparatus and a method for cleaning air carrying smoke, grease, ordors and other pollutants. The air having the grease and other pollutants, such as the exhaust air from a restaurant cooking grill, is passed through a filter box in which is mounted two pairs of planar filter members. The air is passed sequentially in halves through a lower pair of the filter members and then through an upper pair of the filter members and out of the filter box. The filter members are continuously scrubbed by a scrubbing solution comprising cold water and a cold water detergent. The water cools the air and grease in the air is congealed, and it acts as a filter, and it removes the congealed grease from the filter members.

14 Claims, 10 Drawing Figures

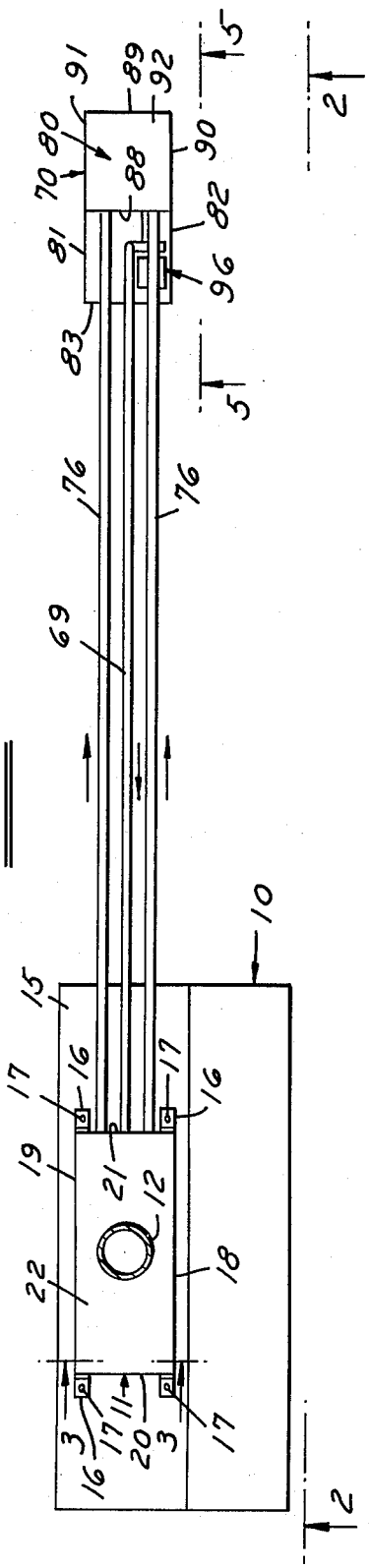
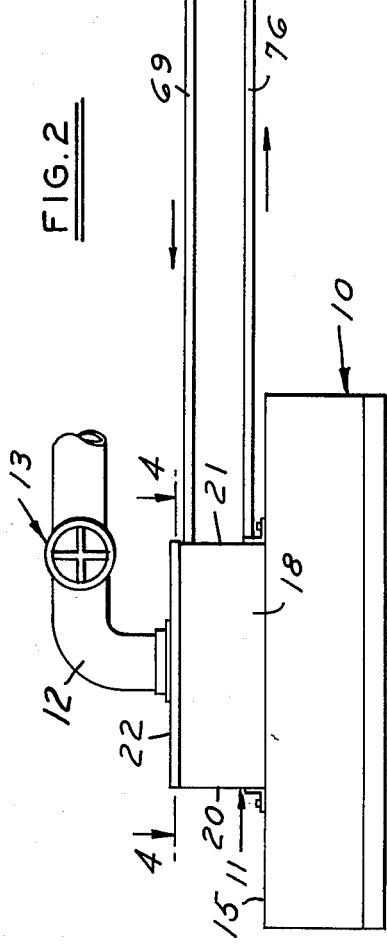
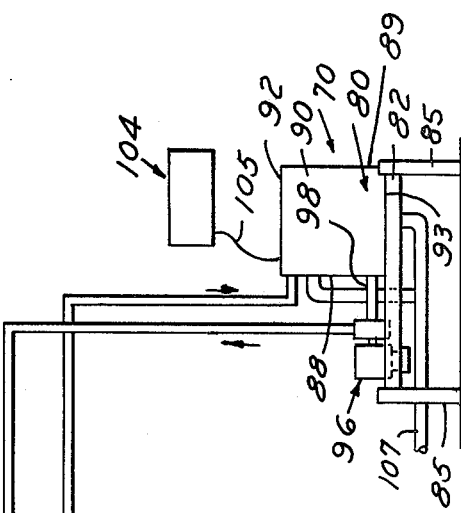
FIG.1
FIG.2

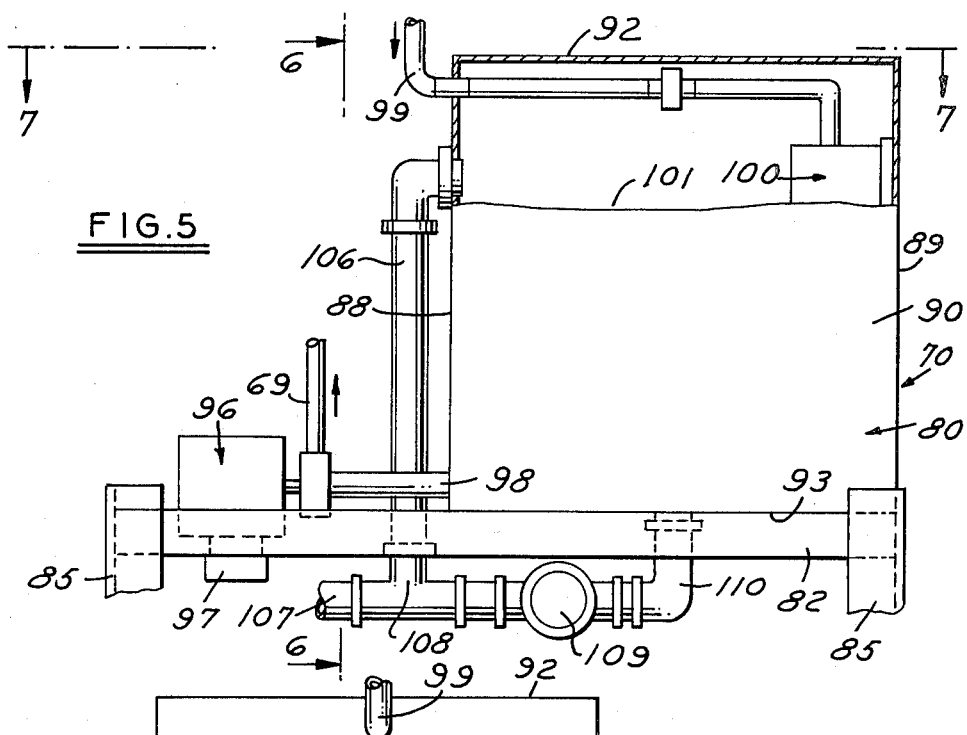
FIG.5
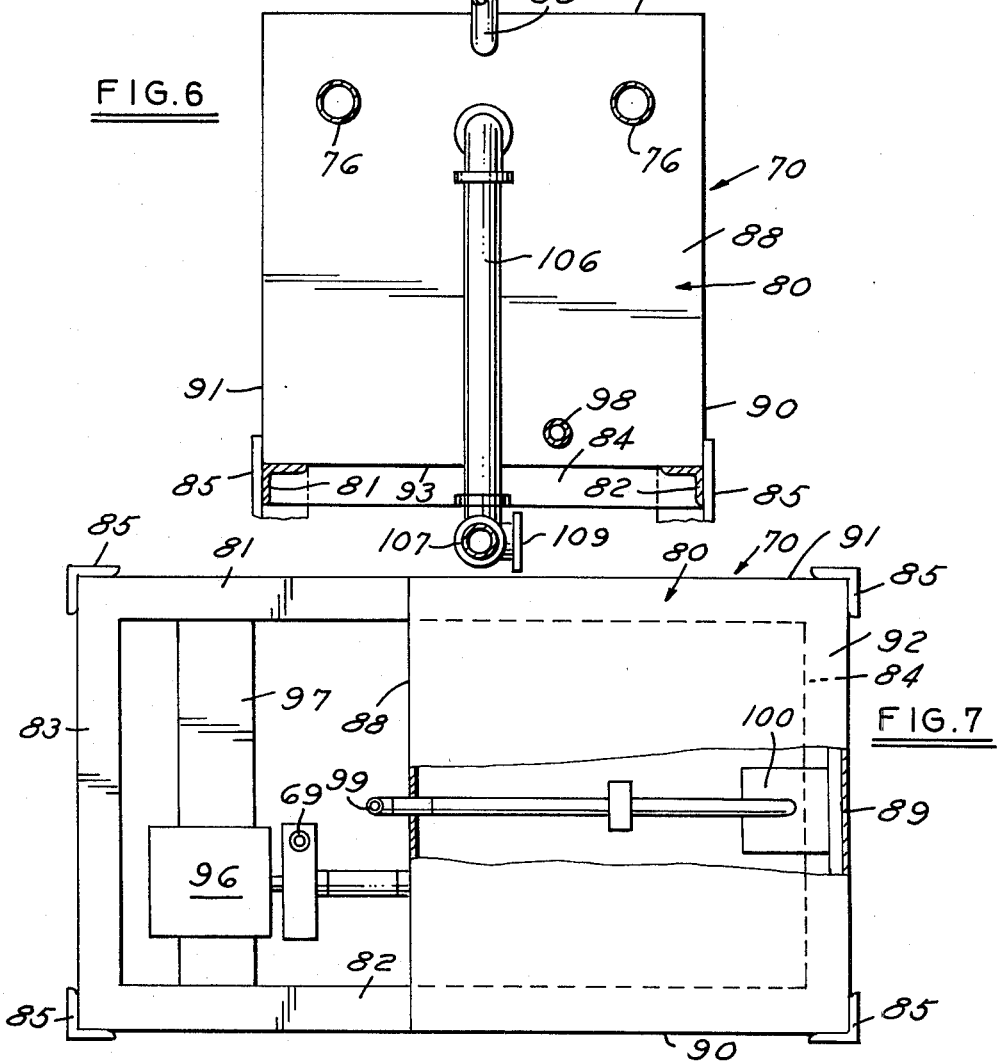
FIG.6
FIG.7

4,323,373

APPARATUS AND METHOD FOR CLEANING AIR

TECHNICAL FIELD

This invention relates to a method and apparatus for cleaning air, and more particularly, to a novel method and apparatus for removing grease, odors and other pollutants from the exhaust air associated with a restaurant cooking grill and the like.

BACKGROUND ART

It is known in the art of cleaning air to provide apparatuses for removing solid particulates and other pollutants from exhaust air associated with cooking grills and stoves in restaurants and other commercial operations. Examples of such prior art air cleaning apparatuses are shown and described in U.S. Pat. Nos. 2,588,612; 3,064,551; 3,086,342; 3,260,189; 3,802,158; 3,812,657; 3,837,269; 3,854,388; 4,050,446; 4,171,722 and 4,231,765.

A disadvantage of the prior art air cleaning apparatuses shown in the aforementioned patents is that they are complex, bulky, and costly to manufacture. Another disadvantage of the prior art air cleaning apparatuses is that they require a large input of electrical energy to operate the same.

DISCLOSURE OF THE INVENTION

In accordance with the present invention, an apparatus and method for cleaning smoke, grease, odors and other pollutants from air is provided which can be employed for various uses, including commercial uses, as for cleaning the exhaust air from a restaurant cooking facility.

The method of the present invention for cleaning air comprises passing the air to be cleaned through a filter box provided with a novel arrangement of planar filter means. The air is passed in halves and sequentially through a first pair of lower planar filter members, and thence through a second pair of upper filter planar members. The planar filter members are continuously scrubbed with a scrubbing solution comprising cold water and a cold water detergent. The scrubbing solution is disposed over the upper planar filter members and allowed to trickle downwardly thereover and thence onto the lower planar filter members and thence into a reservoir means. The scrubbing solution removes the congealed grease and other pollutants from the planar filter members and carries it down into the reservoir means. The congealed grease, pollutants and scrubbing solution is then conveyed from the reservoir means to a collection and settling tank from which it is again recirculated back to the filter box for a continuous scrubbing action on the planar filter members. The collection and settling tank is provided with means for removing the congealed grease and other pollutants from the collection and settling tank, and for monitoring of pH value of the scrubbing solution in the tank and adding additional detergent as required. The level of the scrubbing solution in the tank is also monitored, and fresh water is automatically added as required.

BRIEF DESCRIPTION OF THE DRAWINGS

FIG. 1 is a top plan view of a restaurant cooking grill exhaust canopy provided with an air cleaning apparatus made in accordance with the principles of the present invention.

FIG. 2 is a front elevation view of the air cleaning apparatus illustrated in FIG. 1, taken along the line 2—2 thereof, and looking in the direction of the arrows.

FIG. 5 is an enlarged, side elevation view, with parts removed, of the pumping station employed in the air cleaning apparatus illustrated in FIG. 1, taken along the line 5—5 thereof, and looking in the direction of the arrows.

FIG. 6 is a left side elevation view of the pumping station structure illustrated in FIG. 5, taken along the line 6—6 thereof, and looking in the direction of the arrows.

FIG. 7 is a top plan view of the pumping station structure illustrated in FIG. 5, taken along the line 7—7 thereof, and looking in the direction of the arrows.

BEST MODE FOR CARRYING OUT THE INVENTION

Figure 3:
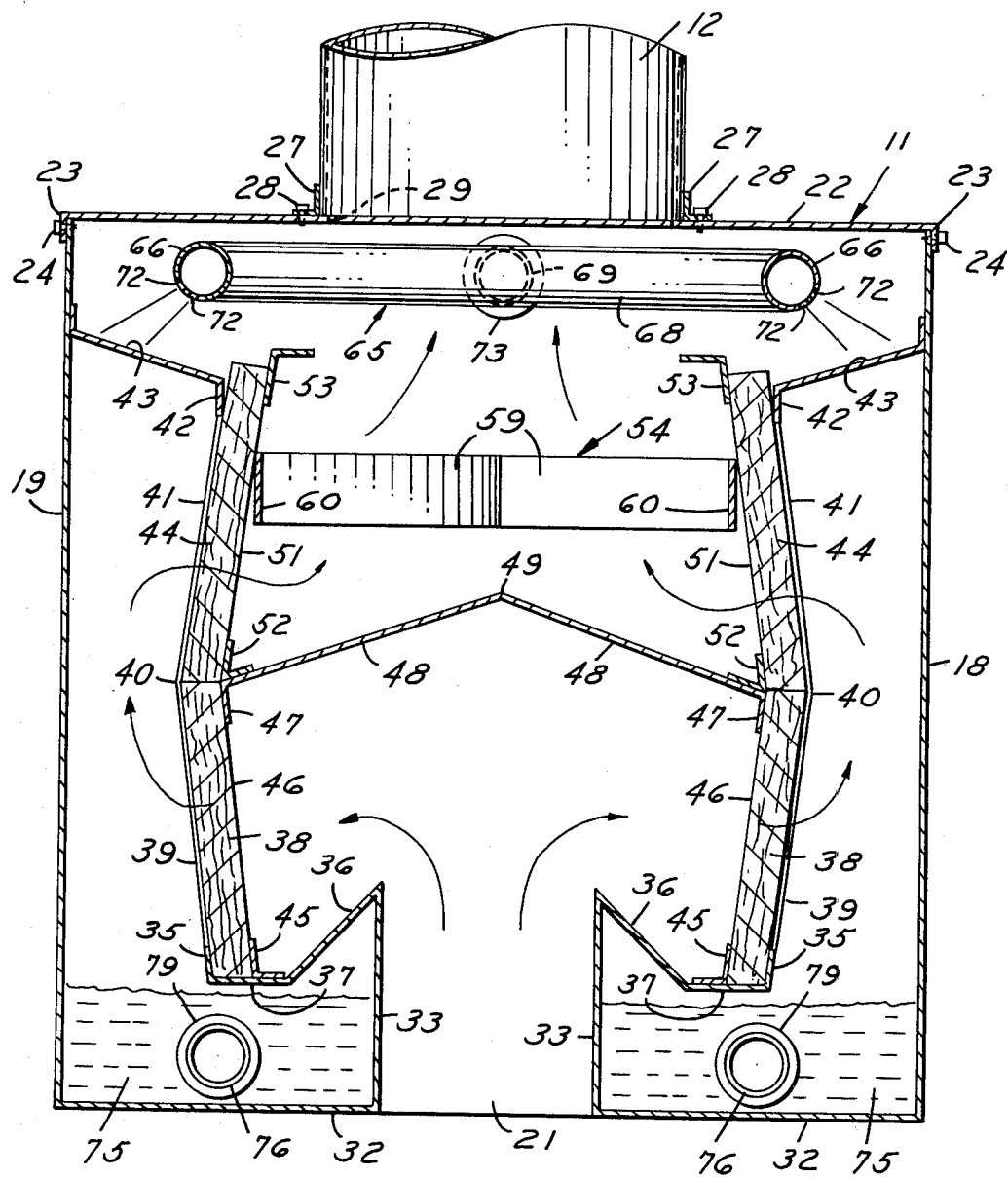
FIG. 3 is an enlarged, elevation section view of the filter box employed in the air cleaning apparatus illustrated in FIG. 1, taken along the line 3—3 thereof, and looking in the direction of the arrows.

Referring now to the drawings, and in particular to FIGS. 1 and 2, the numeral 10 generally designates a conventional restaurant cooking grill exhaust canopy on which is operatively mounted a filter box, generally indicated by the numeral 11, made in accordance with the principles of the present invention. The filter box 11 is connected to an outlet exhaust duct 12 in which is mounted a conventional exhaust fan, generally indicated by the numeral 13. The outlet of the exhaust fan 13 may be selectively connected to the atmosphere, or to the restaurant building to use the cleaned air as make-up air and save heat energy. The exhaust duct 12 is illustrated as extending vertically from the filter box 11, however, it will be understood that it may extend horizontally therefrom, if desired.

The filter box 11 is operatively attached to the upper wall 15 of the exhaust canopy 10, by any suitable means, as by a plurality of brackets 16 which are secured to the filter box 11 as by welding, and to the canopy wall 15 by suitable metal screws 17.

The filter box 11 is formed from a suitable metal as, for example, eighteen gauge stainless steel sheet metal. The filter box 11 does not have to be insulated since it is disposed inside of a restaurant building. As illustrated in FIGS. 1-4, the filter box 11 includes a pair of laterally spaced apart side walls 18 and 19, and a pair of end walls 20 and 21. The last mentioned side and end walls are fixedly connected together at the adjoining edges by any suitable means, as by welding. The filter box 11 is enclosed at its upper end by a top end cover plate 22. As illustrated in FIG. 3, the cover plate 22 is releasably secured on the upper end of the filter box 11 by any suitable means, as by an integral peripheral flange 23 that is releasably secured to the adjacent side walls of the filter box by any suitable means, as by suitable metal screws 24. The exhaust stack 12 is secured to the cover plate 22 by any suitable means, as by a peripheral angle member 27 which is secured by suitable machine screws 28 to the cover plate 22. The peripheral flange member 27 is secured to the exhaust duct 12 by any suitable means, as by welding. The cover plate 22 is provided with a suitable opening 29 (round or square) for communication with the lower end of the exhaust duct 12.

As shown in FIG. 3, the bottom end of the filter box 11 is enclosed along the front and rear sides thereof by a pair of longitudinally disposed bottom end cover plates 32. The outer edges of the cover plates 32 and the ends thereof are fixedly secured, as by welding, to the adjacent side and end walls of the filter box 11. Fixedly secured, as by welding, to each of the inner edges of the bottom end plates 32 is a vertically and upwardly extending plate 33.

In one embodiment, the filter box 11 was made 48 inches long, 24 inches wide and 24 inches high. However, it will be understood that the filter box 11 may be made to any desired size, in accordance with the air cleaning capacity desired. In the last mentioned embodiment, the inlet opening into the bottom of the filter box 11 formed by the spaced apart bottom end plates 32 and the plates 33 was about 6 inches wide and 48 inches long. The last mentioned opening forms a duct area opening which is aligned with a similar opening in the upper end wall 15 of the exhaust canopy 10. In said embodiment, the duct entrance plates 33 extended upwardly from the canopy 10 into the filter box 11 for a distance of approximately 6½ inches.

As shown in FIG. 1, the filter box 11 includes the following described filter support structure. As best seen in FIG. 3, a downwardly angled, longitudinally support plate 36 is disposed on the inner side of each of the duct opening side wall plates 33. Each of the support plates 36 has its upper end secured, as by welding, to the upper edge of the adjacent duct opening side wall plate 33. The outer ends of the plates 36 may also be fixedly secured, as by welding, to the end walls 20 and 21 of the filter box 11. The support plates 36 angle downwardly and outwardly from the duct opening side wall plates 33 at a suitable angle of about 45°. Fixedly secured, as by welding, to the lower inner ends of each of the support plates 36 is a longitudinally extended, horizontal support plate 37. In said embodiment, the width of each of the support plates 36 was 4 inches, and the width of the support plates 37 was 2 inches. The ends of the support plates 37 may also be secured, as by welding, to the filter box end walls 20 and 21. A vertical, longitudinal flange 35 is secured, as by welding, to the outer end of each of the support plates 37. A lower stainless steel expanded metal support member 39 has its lower end fixedly secured, as by welding, to the upper end of each of the flanges 35. As shown in FIG. 3, each of the support members 39 forms an outer support wall for a DACRON filter 38.

As shown in FIG. 3, the upper end of each of the expanded metal support plates 39 is fixedly connected, as by welding, to the lower end 40 of an upper expanded metal plate 41. The upper end of the expanded metal plate 41 is fixedly secured, as by welding, to the lower end of a vertical flange 42 that is formed on the inner end of an inwardly sloping water pan 43. It will be understood that the flanges 35, the expanded metal sheets 39 and 41, the flanges 42, and the sloping pans 43, each extend for the longitudinal length of the filter box 11, and that the ends thereof may be fixedly secured to the end walls 20 and 21 of the filter box 11, by any suitable means, as by welding. The outer edge of each of the sloping pans or plates 43 is secured, as by welding, to the side walls 18 and 19. The plates 43 slope downwardly and inwardly at a suitable angle of about 15° and in said one embodiment they were about four and one half inches wide. The inwardly sloping plates 43 function as water distribution pans which will be explained more fully hereinafter. The upper expanded metal plates 41 each engage and support the outer surface of an upper DACRON filter 44.

Each of the lower filters 38 is releasably held in place against the outer expanded metal plate 39 by an inner stainless steel expanded metal plate 46. Each of the expanded metal plates 46 is spaced inwardly about one inch from the adjacent outer expanded metal plate 39. The lower end of each of the inner expanded metal plates 46 is fixedly secured, as by welding, to an angle bracket 45 which is secured, as by welding, to the upper face of the adjacent support plate 37. The upper end of each of the inner expanded metal plates 46 is secured, as by welding, to a flange 47 which is fixed, as by welding, to the outer end of a deflector plate or pan 48. The deflector pans 48 angle inwardly and upwardly, and their inner ends are fixedly connected, as by welding, at a central, longitudinal point indicated by the numeral 49. It will be understood that the inner expanded metal plates 46, the flanges 47, and the deflector pans 48 extend for the length of the filter box 11, and that they have their ends fixedly secured to the end walls 20 and 21 by any suitable means, as by welding.

Figure 4:
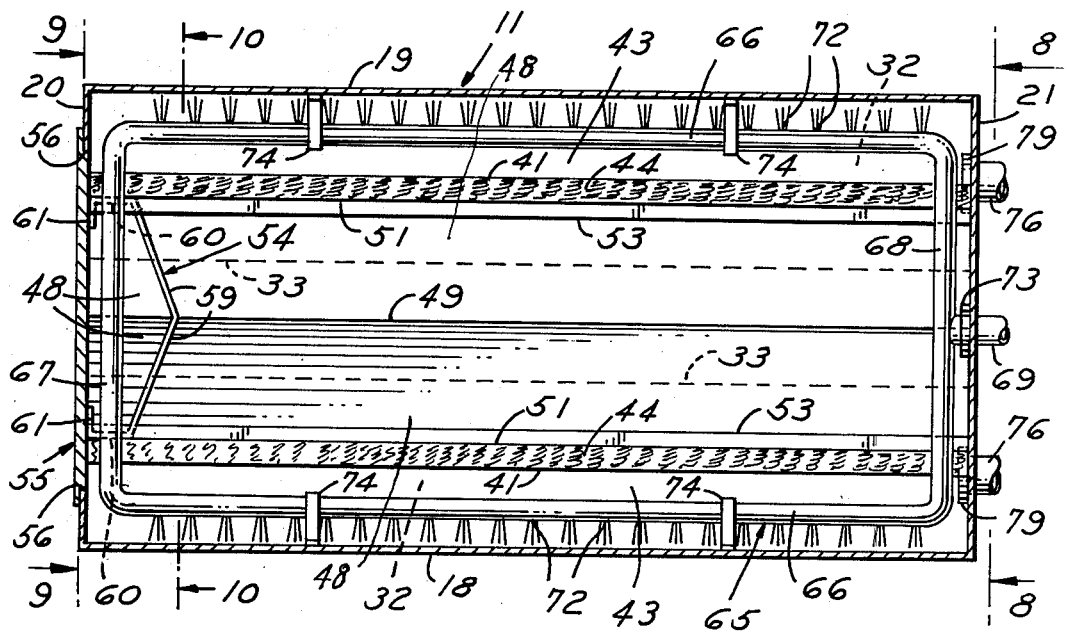
FIG. 4 is a horizontal section view of the filter box employed in the air cleaning apparatus illustrated in FIG. 2, taken along the line 4—4 thereof, with parts removed, and looking in the direction of the arrows.
Figure 8:
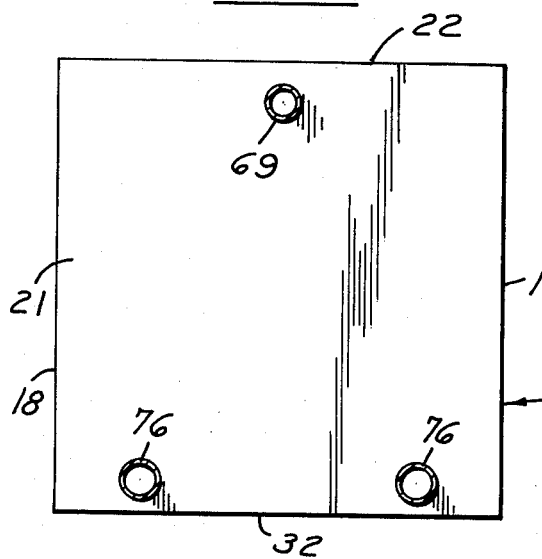
FIG. 8 is a right side elevation view of the filter box structure illustrated in FIG. 4, taken along the line 8—8 thereof, and looking in the direction of the arrows.
Figure 9:
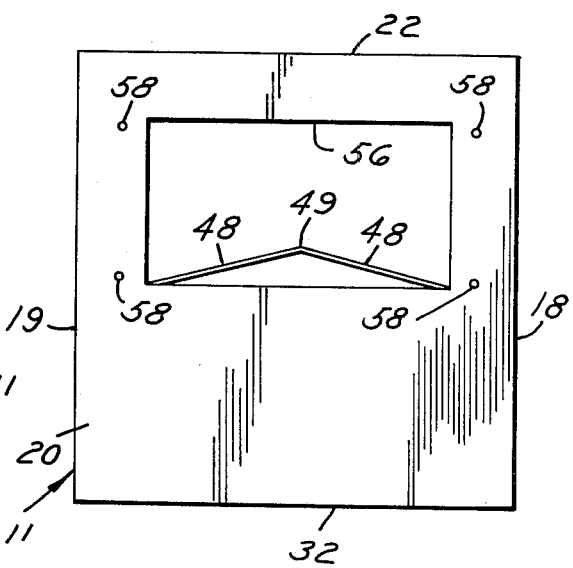
FIG. 9 is a left end view of the filter box structure illustrated in FIG. 4, taken along the line 9—9 thereof, and looking in the direction of the arrows, and with the filter box door removed.
Figure 10:
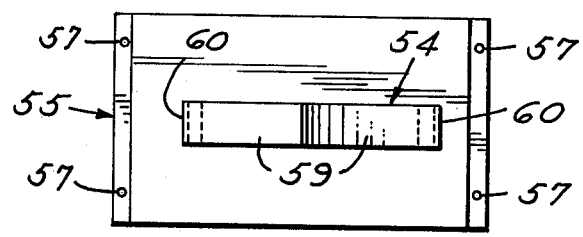
FIG. 10 is an elevational view of the filter box door, taken along the line 10—10 of FIG. 4, and looking in the direction of the arrows, and showing the door removed from the filter box.

The upper filters 44 are each retained in their operative positions shown in FIG. 3, by a releasably mounted stainless steel expanded metal plate 51. As shown in FIG. 3, the lower end of each of the expanded metal plates 51 is slidably mounted behind an angle bracket 52 which is longitudinally disposed and fixedly secured, as by welding, to the upper face of the adjacent deflector pan 48. A longitudinal bracket 53 is fixedly secured, as by welding, to the upper inner edge of each of the expanded metal plates 51. The expanded metal plates 51 are releasably held in position by a filter holder bracket, generally indicated by the numeral 54 in FIGS. 3 and 4. The filter holder bracket 54 is carried by a door, generally indicated by the numeral 55 in FIGS. 4 and 10. As shown in FIGS. 4 and 10, the door 55 is adapted to close an opening 56 formed through the filter box end wall 20. The opening 56 provides access to the inside of the filter box 11 for service purposes including the replacement of the lower and upper filters 38 and 44, respectively. The door 55 overlaps the opening 56 and it is secured to the filter box wall 11 by any suitable means, as by thumb screws 57.

As shown in FIGS. 4 and 10, the filter holder bracket 54 includes a pair of transverse metal strips 59 which angle inwardly and toward each other, and which are joined together, as by welding, at their inner ends. The outer end of each of the transverse strips 59 is fixed, as by welding, to the front end of a longitudinally disposed metal strip 60. The rear end of each of the metal strips 60 is fixed, as by welding, to a transverse flange 61. The transverse flanges 61 are fixed, as by welding, to the inner face of the door 55. As shown in FIG. 4, when the door 55 is mounted in place on the filter box end wall 20, the filter holder bracket 54 extends inwardly into the filter box 11 and the side strips 60 slidably engage the expanded metal upper plates 51 to releasably hold them in the position shown in FIG. 3, to support the upper filters 44 in the operative position shown in FIG. 3. It will be seen that the longitudinal angle brackets 53 provide stiffness to the upper expanded metal inner metal plates 51, and that the converging inner end strips 59 on the filter bracket holder 54 function to bias the expanded metal plates 51 outwardly when the filter holder bracket 54 is moved into the filter box 11.

In said one embodiment, the filters 38 and 44, and their supporting expanded metal plates 39, 41, 46 and 51 were disposed in a substantially diamond shaped configuration, as shown in FIG. 3. The filters 38 and 44 are preferably made from DACRON, and suitable filters of this type are available under Model #15/40, from the Air Filter Sales and Service of Detroit, 431 Stephenson Highway, Troy, Mich. The filters 38 and 44 in said one embodiment were one inch thick, $7\frac{3}{4}$ inches high and $47\frac{3}{4}$ inches long. The overall height of the outer expandable metal plates 39 and 41, and the flanges 35 and 42 in said one embodiment was about $17\frac{1}{4}$ inches. The overall length of the angled water pans 43 was about $4\frac{1}{2}$ inches. The overall width of the filter holder bracket 54 in said one embodiment was about 13 inches, between the longitudinal strips 60. In said embodiment, the transverse filter bracket strips 59 were about 8 inches long, and the longitudinal strips 60 were about 2 inches long.

The numeral 65, in FIGS. 3 and 4, generally designates a water distribution means for distributing water to the filters 38 and 44. As best seen in FIG. 4, the water distribution means 65 includes a pair of spaced apart pipes 66 which are longitudinally disposed, with one of said pipes along each side of the filter box 11. A transverse pipe 67 connects one of the ends of each of the longitudinal pipes 66 together, at the door end of the filter box 11. The other ends of the longitudinal pipes 66 are connected by means of a second transverse pipe 68 at the other end of the filter box 11. As shown in FIGS. 3 and 4, the transverse pipe 68 communicates with an inlet pipe 69. As shown in FIGS. 1 and 2, the water inlet pipe 69 is connected to a pumping station, generally indicated by the numeral 70. The pumping station 70 may be disposed in the vicinity of the filter box 11, in any desired location.

In said one embodiment of the invention, the pipes 66, 67, 68 and 69 comprise $1\frac{1}{2}$ inch P.V.C. pipe. The water distribution means 65 may be supported in the position shown in FIG. 3, in the upper end of the filter box 11, by any suitable means, as for example by a plurality of suitable brackets 74 which encircle the longitudinal pipes 66, and have their outer ends fixedly secured to the filter box walls 18 and 19, by any suitable means, as by welding. The water inlet pipe 69 also functions to provide additional support for the water distribution means 65, at the point where it goes through the filter box end wall 21, by means of a conventional P.V.C. bulkhead pressure fitting 73.

As illustrated in FIG. 3, the water inserted into the filter box 11 by the water distribution means 65 flows outward through ports 72 in the pipes 66, and it flows downwardly by gravity, as explained in detail hereinafter, and is collected in the two water pans or reservoirs, indicated by the numeral 75. The water reservoirs 75 are formed by the filter box side walls 18 and 19, the filter box bottom walls 32 and the duct entrance walls 33. The two reservoirs 75 are each connected by means of a separate return pipe 76 to the pumping station 70. In said one embodiment, a 2 inch P.V.C. pipe was employed for each of the pipes 76. As shown in FIG. 4, the return pipes 76 each pass through the filter box end wall 21, and are operatively mounted therethrough by means of a conventional P.V.C. bulkhead pressure fitting 79 to make the passage of these pipes through said side wall 21 water tight and prevent gases from leaking through said side wall 21 at these points.

As best seen in FIGS. 5, 6 and 7, the pumping station 70 includes a reservoir tank, generally indicated by the numeral 80, which is supported on an angle iron frame. As shown in FIG. 7, the angle iron frame includes a pair of laterally spaced apart, longitudinal angle irons 81 and 82 which are fixedly connected at their ends to the transverse angle iron members 83 and 84. The angle iron frame is supported at each corner by a fixedly mounted angle iron leg 85.

The reservoir tank 80 includes a front wall 88, a rear wall 89, and a pair of side walls 90 and 91. The reservoir tank 80 also includes a top end wall 92 and a bottom end wall 93 (FIGS. 5 and 6). In said one embodiment of the invention, the reservoir tank 80 was made to a size to hold approximately fifty-five gallons of water mixed with a suitable detergent. As shown in FIG. 6, the return pipes 76 are operatively connected to the tank 80 through suitable fittings in the tank front wall 88.

As best seen in FIGS. 5 and 7, a suitable pump 96 is operatively mounted on a transverse support channel member 97 which is fixedly mounted between the frame support angle irons 81 and 82. The pumps 96 is provided with an inlet pipe 98 which is operatively connected to the tank 80 through suitable fittings in the tank front end wall 88. The outlet of the pump 96 is connected to the supply pipe 69 for supplying the water and detergent solution to the filter box 11. A suitable pump employed in said aforementioned embodiment was a $\frac{1}{4}$ horsepower pump having a $1\frac{1}{4}$ inch inlet and a $1\frac{1}{4}$ inch outlet.

Water is supplied from a suitable source of cold water through an inlet pipe 99 mounted in the upper end of the tank 80, as shown in FIGS. 5, 6 and 7. The inlet pipe 99 is operatively connected through a water level control apparatus, generally indicated by the numeral 100. Any conventional water level control apparatus may be employed to carry out the function of maintaining the water level in the tank 80, and for admitting enough make-up fresh water to maintain the proper water level in the water tank 80, as indicated by the numeral 101 in FIG. 5.

The numeral 104 generally designates an automatic detergent or soap dispenser which is operatively connected through a suitable conduit 105 to the tank 80. A suitable cold water detergent dispenser for automatically adding detergent to the water in the tank 80 is one available on the market from the Economics Laboratory, Inc. of 4 Corporate Park Drive, White Plains, N.Y. 10604, and known as Model CM-40. The detergent dispenser 104 is equipped with a sensing device which senses the pH factor to determine when the water in the tank 80 is dirty, and when more detergent has to be added to the tank 80 to maintain the detergent solution at a proper level.

As best seen in FIGS. 5 and 6, the tank 80 is provided with a two inch overflow drain pipe 106 which is connected through a tee fitting 108 to a pipe 107. The pipe 107 is also connected by a gate valve 109 to a two inch pipe 110 for draining the tank 80. The pipe 107 would be connected to the sewer system or to a grease trap, in accordance with proper procedures permitted by the local codes.

The aforedescribed air cleaning apparatus is adapted to act as an air purifier to remove smoke, odors and grease from the air exhausting from restaurant cooking grills and other food preparation activities. From the foregoing description of the air cleaning apparatus, it will be seen that the apparatus of the present invention employs four water-activated DACRON fiber filters, (38, 44) which are 48"×7"×⅛" in dimention. The filters 38 and 44 are installed in a manner which requires half of the exhaust gas to pass through two of the filters and the other half to pass through the other two filters before exiting the air cleaning apparatus. The filters 38 and 44 are continuously cleaned by a scrubbing solution containing cold water and a commercial cold water dishwasher detergent which is trickled over all of the four filters. After passing over the DACRON filters, the scrubbing solution is returned to a settling tank 80 and then pumped back over the filters 38 and 44. The detergent levels in the scrubbing solution are continuously regulated by a pH monitor or sensor installed in the settling tank 80, thus maintaining the pH of the scrubbing solution. Experience has shown that the air cleaning apparatus of the present invention is a highly efficient apparatus for removing odors, grease and other pollutants from the air in a restaurant exhaust system.

In use, it will be seen that the pump 96 pumps the cold water mixed with a suitable detergent into the pipe 69 and thence into the water distribution means 65 in the filter box 11. As illustrated in FIGS. 3 and 4, the cold water and detergent forms a scrubbing solution which is sprayed through ports 72 formed along the outer sides of the longitudinal pipes 66 and onto the water pans 53. The scrubbing solution then flows by gravity inwardly and downwardly onto the upper DACRON filters 44. The scrubbing solution then trickles down over the top filters 44 and the lower filters 38. The scrubbing solution then passes down into the reservoirs 75 from whence it flows by gravity back to the collecting and settling tank 80 through the return pipes 76.

As shown in FIG. 3, the exhaust gases from a restaurant cooking grill or other device are pulled upwardly through the opening between the duct opening walls 33 from whence the gases are diverted outwardly to the left and right so that half of the gases pass through one lower DACRON filter 38 on one side of the filter box and the other half pass through the other lower DACRON filter 38 on the other side of the filter box. The exhaust gases are then directed upwardly, and then inwardly through the two upper filters 44, and thence out through the stack 12. It will be seen that as the cooking exhaust gases are directed upwardly through the filter box 11, that a cleaning action is provided by the filter box 11 so as to clean the exhaust air of grease, odors, smoke and other solid pollutants.

It has been found that exhaust air cleaned by the apparatus of the present invention possesses such a high quality of cleaniness that it can be used if desired, as make-up air for the restaurant, if it is desired to employ the heat left in such exhaust gases as an energy saver. The cold water and detergent solution activates the filters 38 and 44 so as to continuously clean these filters as well as removing any grease or other pollutants congealing on the filters, and to carry such congealed grease and pollutants downwardly into the collecting tanks 75. When the water carrying the removed grease and pollutants is conveyed back to the settling tank 80, the grease is skimmed off of the top and goes out through the top and goes out through the overflow drain 106. It will be understood that the detergent breaks down the grease so that it can be moved back with the water into the tank 80, and a large amount of water can be continuously recycled.

Experience has shown that the exhaust air cleaning apparatus of the present invention does such a highly efficient job in cleaning restaurant exhaust air that the exhaust duct leading from the filter box 11 is free of any grease. The elimination of grease in a restaurant exhaust duct eliminates grease fires in such exhaust ducts. It is seen that the apparatus of the present invention functions not only as an exhaust air cleaning or air pollution prevention device, but also as a fire prevention system for a restaurant exhaust system, because it keeps such an exhaust system free of grease. The last mentioned optimum result enables a restaurant provided with an apparatus of the present invention to seek reduced insurance rates due to its clean exhaust system and the elimination of one of the major causes of restaurant fires.

Under ordinary operating conditions, it has been found that the DACRON filters 38 and 44 should be changed at least once every six months. With a heavy output of exhaust gases, it would be necessary to change these filters more frequently. Experience has also shown that it is preferable to drain the settling tank 80 and clean the system at least once a week.

All of the metal units of the air cleaning apparatus of the present invention are preferably constructed of stainless steel, and all of the pipes and fittings are preferably made from P.V.C. so that they will not be attacked by the harsh cold water detergent.

It will be understood that the supply pipe 69 and the return pipe 76 may be operatively connected to either end of the filter box 11, or to the sides thereof, if desired. It will be understood that more than one pump 96 may be attached to the settling tank 80 to supply more than one filter box 11, and that the tank 80 may be enlarged in accordance with a desired capacity.

The filters 38 and 44 may be termed planar filter means. The filters 38 and 44 are preferably formed from DACRON, which is a well known synthetic textile fiber, and the coarse side thereof is preferably disposed to face outwardly in the filter box 11.

INDUSTRIAL APPLICATION

The method and apparatus for cleaning air in accordance with the present invention is adapted for use in commercial and industrial operations where the air exhausting from such operations contains grease, smoke, odors, and other pollutants. An example of the use of the apparatus and method of the present invention is the cleaning of the exhaust air from restaurant cooking equipment.

I claim:

1. A method of removing smoke, grease, odors and other pollutants from air by passing said air through a filter box comprising the steps of:
   (a) passing half of the air through one of a first pair of planar filter members, and passing the other half of the air through the other of said first pair of planar filter members;
   (b) and then sequentially passing said first half of the air through a first one of a second pair of planar filter members and said other half of the air through the second one of said second pair of planar filter members; and, (c) continuously cleaning congealed grease and other pollutants from said planar filter member by passing a scrubbing solution sequentially downward by gravity through said second pair of filter members initially, and then through said first pair of planar filter members, and then passing the scrubbing solution and congealed grease and other pollutants cleaned from said planar filters into a reservoir means.

2. The method as defined in claim 1, wherein:
(a) said scrubbing solution comprises cold water and a cold water detergent.

3. The method as defined in claim 2, including the steps of:
(a) continuously conveying the scrubbing solution and congealed grease and other pollutants from said reservoir means to a collecting and settling tank;
(b) removing the congealed grease and other pollutants from the scrubbing solution in the collecting and settling tank;
(c) adding additional cold water to maintain a predetermined level of the scrubbing solution in the collecting and settling tank;
(d) selectively adding additional amounts of the cold water detergent to maintain a predetermined pH of the scrubbing solution; and,
(e) continuously conveying scrubbing solution from the collecting and settling tank back to the planar filters to maintain the continuous cleaning of the same.

4. In an apparatus for clearing air having smoke, grease, odors, and the like as pollutants therein, characterized in that:
(a) said apparatus includes a filter box having side walls, end walls, a top wall, and a bottom wall;
(b) said filter box is provided with an air inlet opening, and an air exhaust opening;
(c) means is connected to said air exhaust opening for moving air through said filter box;
(d) said filter box is provided with an air inlet duct communicating with said air inlet opening;
(e) a first lower planar filter means is disposed in the filter box on one side of said air inlet duct, and a second lower planar filter means is disposed in the filter box on the other side of said inlet duct;
(f) a first baffle means is mounted in the filter box for directing a part of the air moving into the filter box through said air inlet duct through said first lower filter means, and for directing the remaining part of the air moving into said filter box through said air inlet duct through said second lower filter means;
(g) a first upper planar filter means is disposed in the filter box on said one side of said air inlet duct above said first lower filter means, and a second upper planar filter means is disposed in the filter box on the other side of said inlet duct above said second lower filter means;
(h) a second baffle means is mounted in the filter box for directing said part of the air after it has passed through said first lower filter means, through said first upper filter means and thence into said air exhaust opening, and for directing the said remaining part of the air after it has passed through said second lower filter means through said second upper filter means and thence into said air exhaust opening; and,
(i) means for continuously cleaning congealed grease and other pollutants from said lower and upper filter means by a scrubbing solution sequentially passed thereover by gravity.

5. An apparatus for cleaning air as defined in claim 4, characterized in that:
(a) said scrubbing solution comprises cold water and a cold water detergent.

6. An apparatus for cleaning air as defined in claim 5, characterized in that said means for continuously cleaning said lower and upper filter means by a scrubbing solution includes:
(a) a scrubbing solution distribution means mounted in said filter box above said upper planar filter means; and,
(b) scrubbing solution pan means mounted in said filter box for continuously receiving scrubbing solution from said scrubbing solution distribution means and conveyint the scrubbing solution onto the first and second upper planar filter means, along the length thereof, so that the scrubbing solution passes downwardly by gravity over the first and second upper planar filter means, and thence sequentially down over the first and second lower filter means to remove the congealed grease and other pollutants from the filter means.

7. An apparatus for cleaning air as defined in claim 6, characterized in that said means for continuously cleaning said lower and upper filter means by a scrubbing solution includes:
(a) a reservoir means in the lower end of the filter box for receiving the congealed grease and other pollutants removed from the filter means and the scrubbing solution passing down from the lower filter means;
(b) a collecting and settling tank;
(c) means connecting said reservoir means with said collecting and settling tank for continuously conveying the congealed grease and other pollutants and scrubbing solution to said collecting and settling tank; and,
(d) pump means connected to said collecting and settling tank and to said scrubbing solution distribution means for continuously supplying scrubbing solution from said collecting and settling tank to said scrubbing solution distribution means.

8. An apparatus for cleaning as defined in claim 7, characterized in that:
(a) releasable holder means is provided in said filter box for releasably retaining said upper and lower planar filter means in position in the filter box.

9. An apparatus for cleaning air as defined in claim 7, characterized in that said means for continuously cleaning said lower and upper filter means by a scrubbing solution includes:
(a) means for monitoring the level of the scrubbing solution in said collecting and settling tank.

10. An apparatus for cleaning air as defined in claim 9, characterized in that said means for continuously cleaning said lower and upper filter means by a scrubbing solution includes:
(a) means for monitoring the pH of the scrubbing solution and for selectively adding cold water detergent to the scrubbing solution in accordance with said monitoring of the pH.

11. An apparatus for cleaning air as defined in claim 10, characterized in that:

(a) said collecting and settling tank is provided with means for removing the congealed grease and other pollutants from said tank.

12. An apparatus for cleaning air as defined in claim 7, characterized in that:
(a) the lower end of each of the upper planar filter means abuts the upper end of the lower planar filter means over which it is disposed.

13. An apparatus for cleaning air as defined in claim 12, characterized in that:
(a) each of the upper planar filter means slopes downwardly and outwardly; and,
(b) each of the lower planar filter means slopes downwardly and outwardly.

14. An apparatus for cleaning air as defined in claim 13, characterized in that:
(a) each of said planar filter means is formed from a synthetic textile fiber.

* * * * *